Sept. 11, 1962 R. S. CHALLENDER ETAL 3,053,746
COOLING SYSTEMS FOR NUCLEAR REACTORS
Filed June 24, 1958 2 Sheets-Sheet 1

INVENTORS
RONALD SCOTT CHALLENDER
AUGUST ROUMPH
BY Larson and Taylor
ATTORNEYS ical elevation of one form of the invention.

United States Patent Office 3,053,746
Patented Sept. 11, 1962

3,053,746
COOLING SYSTEMS FOR NUCLEAR REACTORS
Ronald Scott Challender, Appleton, near Warrington, and August Roumph, Culcheth, near Warrington, England, assignors to United Kingdom Atomic Energy Authority, London, England
Filed June 24, 1958, Ser. No. 744,186
Claims priority, application Great Britain June 24, 1957
2 Claims. (Cl. 204—193.2)

This invention relates to nuclear reactors of the kind having a form of re-entrant coolant circuit wherein coolant moves in a flow path, firstly through the annular space between inner and outer concentric tubes, the outer tube forming part of the core structure of the reactor and, secondly, through the inner tube over fuel elements contained therein.

According to the invention in a reactor of the kind described, the inner tube is rotatable about its longitudinal axis, and has means restricting said flow path according to the degree of rotation of said inner tube.

Two embodiments of the invention will now be described by way of example with reference to the accompanying drawings in which.

Figure 1:
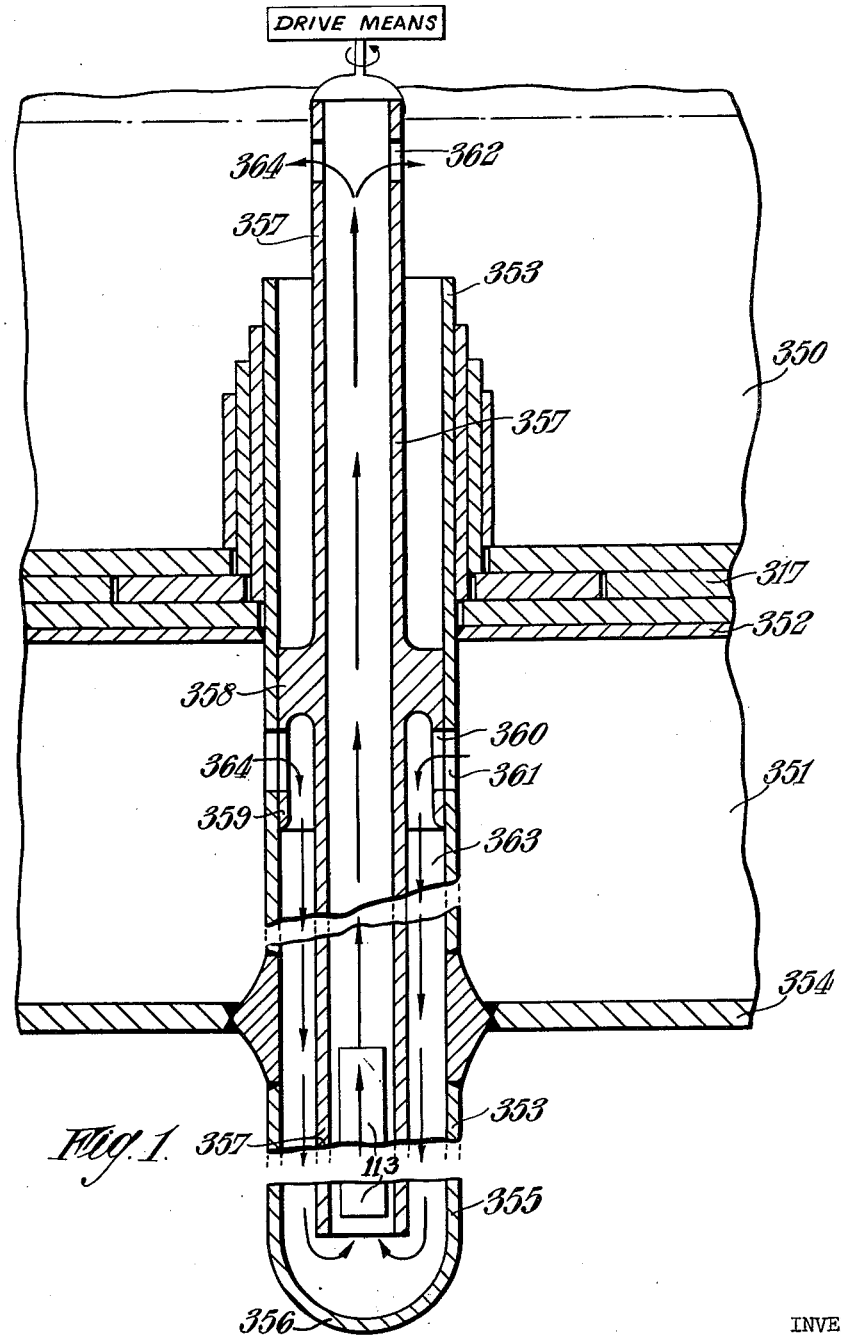
FIG. 1 is a longitudinal sectional elevation of one form of the invention.

In FIG. 1 there is shown part of the structure of a graphite moderated liquid sodium cooled nuclear reactor including hot and cold sodium tanks 350 and 351 separated by a diaphragm 352 thermally insulated by layers of tiles 317. An outer structural tube 353 passes from the hot sodium header tank 350 through the cold sodium header tank 351 and is welded in passage through the diaphragm 352 and through a plate 354, forming the base of the cold sodium header tank 351. A tube 355 coupled with the structural tube 353 has a lower closed end 356. An inner tube 357 having both ends open, passing coaxially through the tubes 353 and 355 is plugged in the tube 353 by an integral flange 358. A skirt 359 integral with the flange 358 and spaced from the inner tube 357 has diametrically opposed ports 360 complementary in size and shape to ports 361 in the tube 353 connecting with the cold sodium header tank 351. The inner tube 357 has ports 362 connecting with the hot sodium header tank 350 and is rotatable within the outer structural tube 353. Drive means are illustrated for this purpose in FIG. 1.

In operation cold sodium passes from the cold sodium header tank 351 through the ports 360 and 361 into the annular space 363 between the tubes 353 and 357. From the annular space 363 the sodium passes up the inner tube 357 over fuel elements 113 contained therein and out into the hot sodium header tank 350 through the ports 362. The sodium becomes heated in traversing the above flow path (shown by the arrows 364 in FIG. 1). Control of the sodium flow rate is obtained by rotating the inner tube 357 relative to the outer tube 353 thus altering the overlap of the ports 360 and 361 to vary the available port area open to the passage of sodium.

Figure 2:
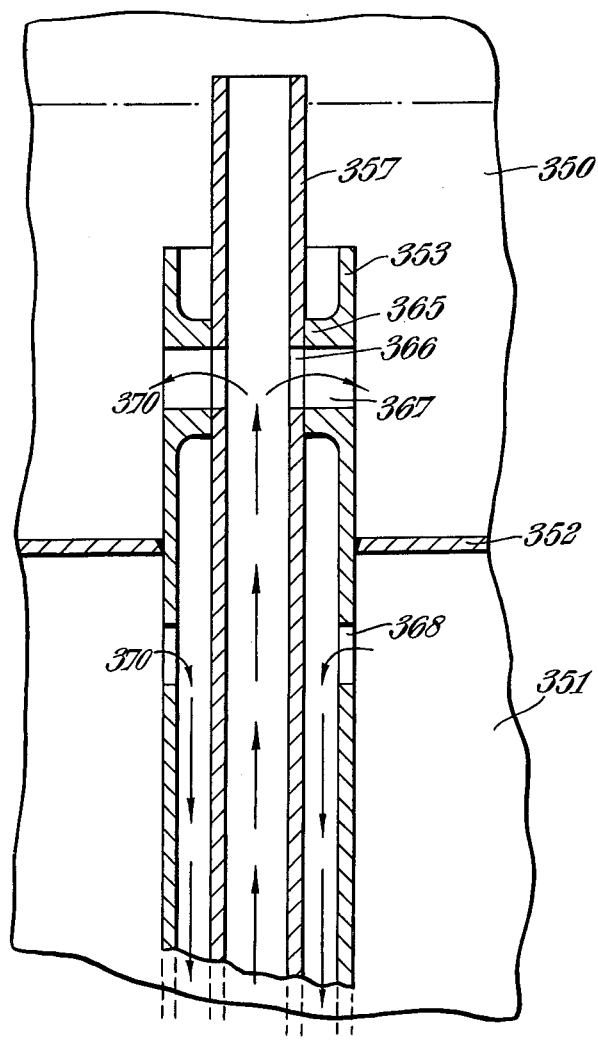
FIG. 2 is a longitudinal sectional elevation of an alternative form of the invention.

In FIG. 2 there is shown an alternative form of the invention. In this case the inner tube 357 is sealed in the outer tube 353 by an internal flange 365 integral with the tube 353. The inner tube 357 has diametrically opposed ports 366 complementary to ports 367 in the outer tube 353 connecting with the hot sodium header tank 350 and passing through the flange 365. The outer tube 353 also has diametrically opposed ports 368 connecting with the cold sodium header tank 351. Alternatively the flange 365 may be made integral with and external to the inner tube 357.

In this case sodium flow (as indicated by the arrows 379) is from the cold sodium header tank 351 through the ports 368, down the annular space 363 between the tubes 353 and 357, back up the inner tube 357 and into the hot sodium header tank 350 through the ports 366 and 367. Again control of the sodium flow rate is obtained by rotation of the inner tube 357 relative to the outer tube 353 altering the overlap of the ports 366 and 367.

This invention has particular application to the sodium graphite nuclear reactor disclosed in full detail in a copending application Serial No. 744,185, now Patent No. 3,000,728, issued September 19, 1961, of even date in the names of Everett Long and Ronald Scott Challender.

We claim:

1. In a fluid-cooled nuclear reactor, a reactor cell comprising means defining a tank for cold coolant and a tank for hot coolant, an outer tube having a closed end and an inner tube coaxially disposed in the outer tube, said outer and inner tubes being spaced from one another by an annular passage through which the coolant flows toward said closed outer tube end before flowing re-entrantly over fuel elements disposed in the inner tube, an annular member connected to one of said outer and inner tubes and extending across the passage in spaced relation to the closed outer tube end to define an annular chamber with the respective portions of the outer and inner tubes disposed between the annular member and the closed outer tube end, said outer tube having an inlet port communicating with the cold coolant tank and said inner tube having an outlet port operatively communicating with the hot coolant tank, means defining a passageway in the annular member having an opening at one end operatively communicating with one of said inlet and outlet ports and an opening at the other end operatively communicating with one of said annular chamber and said hot coolant tank respectively, and means for causing relative rotation between said inner and outer tubes whereby flow-through between the cold and hot coolant tanks is regulated by adjusting the extent of overlap between said one of the inlet and outlet ports and the opening of the passageway communicating therewith.

2. A fluid-cooled nuclear reactor according to claim 1 wherein the hot coolant tank is disposed over the cold coolant tank and the outer tube extends substantially vertically from the hot coolant tank through the cold coolant tank.

References Cited in the file of this patent
UNITED STATES PATENTS 415,706     Drake _____ Nov. 26, 1889
1,759,582   Lonsdale _____ May 20, 1930

OTHER REFERENCES

Proceedings of the International Conference on the Peaceful Uses of Atomic Energy, vol. II, held in Geneva Aug. 8–20, 1955, New York, United Nations 1956, p. 345 (article by Yvon).